(12) United States Patent
Kulkarni et al.

(10) Patent No.: US 8,640,242 B2
(45) Date of Patent: Jan. 28, 2014

(54) PREVENTING AND DETECTING PRINT-PROVIDER STARTUP MALWARE

(75) Inventors: Girish R. Kulkarni, Hukkeri (IN); Nandi Dharma Kishore, Bangalore (IN); Pradeep Govindaraju, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 60 days.

(21) Appl. No.: 13/309,225

(22) Filed: Dec. 1, 2011

(65) Prior Publication Data

US 2013/0145469 A1    Jun. 6, 2013

(51) Int. Cl.
*G06F 21/22* (2006.01)
*G06F 9/00* (2006.01)

(52) U.S. Cl.
USPC .............................................. 726/24; 726/22

(58) Field of Classification Search
None
See application file for complete search history.

(56) References Cited

U.S. PATENT DOCUMENTS

| | | | |
|---|---|---|---|
| 7,552,337 B2* | 6/2009 | Chu et al. | 713/176 |
| 7,559,091 B2* | 7/2009 | Chu et al. | 726/27 |
| 7,584,509 B2* | 9/2009 | Wu et al. | 726/27 |
| 7,631,360 B2* | 12/2009 | Wu et al. | 726/26 |
| 7,640,592 B2* | 12/2009 | Wu et al. | 726/26 |
| 7,721,340 B2* | 5/2010 | Wu et al. | 726/27 |
| 7,891,008 B2* | 2/2011 | Fortune et al. | 726/27 |
| 8,291,493 B2* | 10/2012 | Faieta et al. | 726/22 |
| 2009/0327688 A1* | 12/2009 | Li et al. | 713/100 |
| 2010/0146589 A1* | 6/2010 | Safa | 726/3 |
| 2012/0079596 A1* | 3/2012 | Thomas et al. | 726/24 |
| 2012/0102568 A1* | 4/2012 | Tarbotton et al. | 726/23 |
| 2013/0024941 A1* | 1/2013 | Faieta et al. | 726/24 |

* cited by examiner

*Primary Examiner* — Christopher Revak
(74) *Attorney, Agent, or Firm* — Baker Botts L.L.P.

(57) ABSTRACT

A method for preventing malware attacks includes detecting an attempt on an electronic device to modify a print service registry, determining an entity associated with the attempt to modify the print service registry, determining a malware status of the entity, and, based on the malware status of the entity, allowing or denying the modification to the print service registry. The print service registry is configured to store configuration information about mechanisms to be used when printing from the electronic device.

24 Claims, 3 Drawing Sheets

PREVENTING AND DETECTING PRINT-PROVIDER STARTUP MALWARE

TECHNICAL FIELD OF THE INVENTION

The present invention relates generally to computer security and malware protection and, more particularly, to preventing and detecting print-provider startup malware.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

SUMMARY

In one embodiment, a method for preventing malware attacks includes detecting an attempt on an electronic device to modify a print service registry, determining an entity associated with the attempt to modify the print service registry, determining a malware status of the entity, and, based on the malware status of the entity, allowing or denying the modification to the print service registry. The print service registry is configured to store configuration information about mechanisms to be used when printing from the electronic device.

In another embodiment, an article of manufacture includes a computer readable medium and computer-executable instructions carried on the computer readable medium. The instructions are readable by a processor. The instructions, when read and executed, cause the processor to detect an attempt on an electronic device to modify a print service registry, determine an entity associated with the attempt to modify the print service registry, determine a malware status of the entity, and, based on the malware status of the entity, allow or deny the modification to the print service registry. The print service registry is configured to store configuration information about mechanisms to be used when printing from the electronic device.

In yet another embodiment, an article of manufacture includes a processor coupled to a memory and an anti-malware module executed by the processor. The anti-malware module is resident within the memory and communicatively coupled to a print services registry on an electronic device. The anti-malware module configured to detect an attempt on an electronic device to modify a print service registry, determine an entity associated with the attempt to modify the print service registry, determine a malware status of the entity, and, based on the malware status of the entity, allow or deny the modification to the print service registry. The print service registry is configured to store configuration information about mechanisms to be used when printing from the electronic device.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
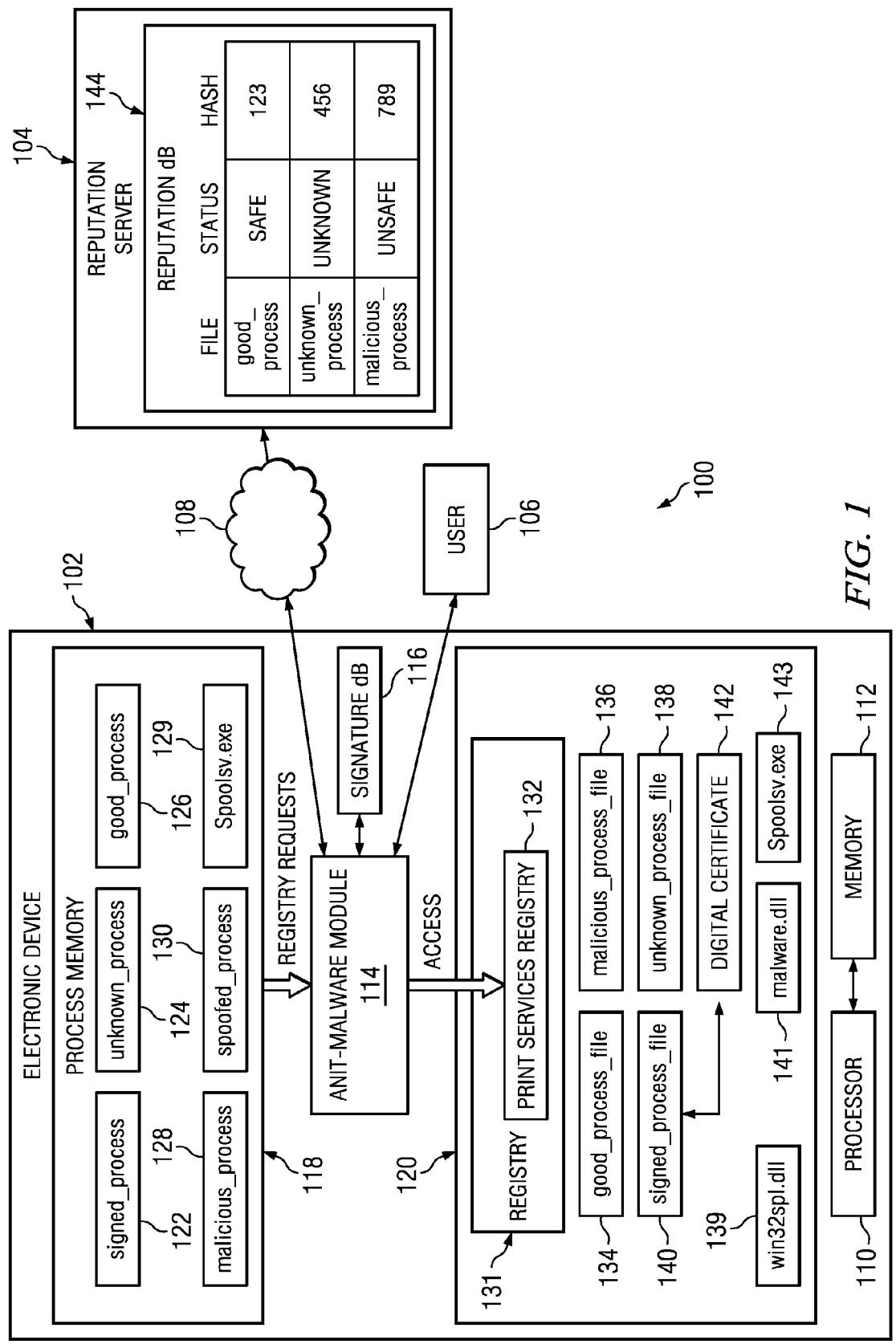
FIG. 1 is an illustration of an example system for preventing and detecting print-provider-based malware.

FIG. 1 is an illustration of an example system 100 for preventing and detecting print-provider-based malware. Such malware may be launched at the startup of print-providers on system 100. System 100 may include an electronic device 102, an anti-malware module 114, a reputation server 104, and a user 106.

Anti-malware module 114 may be configured to monitor or scan electronic device 102 for malware based on print-providers. Print-providers may include software, applications, scripts, utilities, or other entities configured to provide printing services to electronic device 102. Print-providers may be attacked by malware by, for example, modifying settings of print-providers on electronic device 102. The settings may include registry settings. Anti-malware module 114 may be configured to detect attempts to access, modify, or use print-providers on electronic device 102. Anti-malware module 114 may be communicatively coupled to and configured to communicate with reputation server 104 to determine whether detected print-providers or related actions comprise a malware infection. Anti-malware module 114 may be configured to communicate with a user 106 to, for example, provide results or determine corrective actions. Anti-malware module 114 may be configured to carry out one or more corrective actions in response to detection of attempts to access, modify, or use print providers on electronic device 102.

In one embodiment, anti-malware module 114 may be executing on electronic device 102. Anti-malware module 114 may be implemented in an executable, script, library, or any other suitable mechanism. Anti-malware module 114 may be loaded and executed on electronic device 102. Anti-malware module 114 may be communicatively coupled to reputation server 104 through network 108, or any other suitable network or communication scheme.

In another embodiment, anti-malware module 114 may be executing on a device separate from electronic device 102. In such an embodiment, anti-malware module 114 may be communicatively coupled to electronic device 102 through a network. Anti-malware module 114 may be configured to operate in a cloud computing scheme, comprising software resident on a network 108. In such an embodiment, anti-malware module 114 may scan electronic device 104 without executing on electronic device 101. Anti-malware module 114 may be communicatively coupled to reputation server 104 through network 108. Reputation server 104 may comprise a server on network 108.

Anti-malware module 114 may be communicatively coupled to a user 106 of system 100. User 106 may include a human user, a network server configured to administer the operation of electronic device 102, network security settings and preferences, or any other suitable mechanism. In one embodiment, anti-malware module 114 may display results to user 106 and accept selected corrective action. In another embodiment, anti-malware module 114 may be configured to access user 106 to communicate conditions discovered on electronic device 102 and to determine policies or actions to be taken as a result.

Network 108 may include any suitable network, series of networks, or portions thereof for communication between electronic device 104, monitor 102, user 106, and reputation server 104. Such networks may include but are not limited to: the Internet, an intranet, wide-area-networks, local-area-networks, back-haul-networks, peer-to-peer-networks, or any combination thereof.

Electronic device 102 may include any device configurable to interpret and/or execute program instructions and/or process data, including but not limited to: a computer, desktop, server, laptop, personal data assistant, or smartphone. Electronic device 102 may include a processor 110 communicatively coupled to a memory 112.

Processor 110 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 110 may interpret and/or execute program instructions and/or process data stored in memory 112. Memory 112 may be configured in part or whole as application memory, system memory, or both. Memory 112 may include any system, device, or apparatus configured to hold and/or house one or more memory modules. Each memory module may include any system, device or apparatus configured to retain program instructions and/or data for a period of time (e.g., computer-readable media).

Electronic device 102 may include a registry 131 configured to store information regarding installation, configuration, and settings of various applications, services, and programs for electronic device 102. Registry 131 may be implemented by, for example, one or more records, files, databases, or any other suitable mechanisms. Registry 131 may include information organized according to specific applications, services, or programs. Registry 131 may include information organized according to the functionality of various applications, services, or programs. For example, registry 131 may include an entry for utilities, applications, or other programs to configure electronic device 102 to conduct printing operations. Such printing operations may include printing to a printer, file, fax machine, or other suitable device or destination. The entry may be implemented by print services registry 132. As applications, utilities, or other programs for printing are installed on electronic device 102, print services registry 132 may be updated or modified to reflect the new applications, utilities, or other programs. Such applications, utilities, or other programs may include malware or may make malicious changes, and as such anti-malware module 114 may be configured to monitor operations upon print services registry 132.

Operations upon print services registry 132 may be made by, for example, processes or applications running on electronic device 102. Processes or applications running on electronic device 120 accessing print services registry 132 may be spawned by, for example, files or other processes on electronic device 102. The processes or applications may be running in, for example, process memory 118. Process memory 118 may be implemented, for example, in random-access-memory, as a portion of memory 112, or any other suitable memory. The processes or applications running in process memory 118 may also include a default or system-provided print services utility, such as spoolsv.exe 129. Spoolsv.exe 129 may be used to access print settings in print services registry 132 on behalf of other applications on electronic device 102. The processes or applications running in process memory 118 may include processes such as signed_process 122 that are digitally signed or are spawned by files that are digitally signed. The processes or applications running in process memory 118 may include processes such as unknown_process 124 whose malware status is unknown or are spawned from files whose malware status is unknown. The processes or applications running in process memory 118 may include processes such as good_process 126 whose malware status is known to be safe or are spawned from files known to be safe. In addition, the processes or applications running in process memory 118 may include processes such as malicious_process 128 whose malware status is known to be unsafe or are spawned from files known to be unsafe. Furthermore, the processes or applications running in process memory 118 may include processes such as spoofed_process 130 which may have spoofed the action, identity, or other characteristics of another process.

The processes or application running in process memory 118 accessing print services registry 132 may be associated with, spawned from, or otherwise originate from one or more files on electronic device 102. Such files may reside in, for example, storage memory 120. The files included on electronic device 102 related to processes or applications associated with print services registry 132 may include a default file to be accessed when operating print services, such as win32spl.dll 139. Win32spl.dll 139 may spawn execution of spoolsv.exe. In addition, the files may include a file, such as good_process file 134 known to be safe from malware and that spawns good_process 126. Furthermore, the files may include a file, such as malicious_process _file 136 known to be malicious and that spawns malicious_process 128. Also, the files may include a file, such as signed_process_file 140 which may be digitally signed and spawn signed_process 122. Signed_process_file 140 may be digitally signed as verified by a digital certificate 142. Additionally, the files may include a file, such as unknown_process_file 138 whose malware status is unknown and that spawns unknown_process 124. Moreover, the files may also include a file such as malware.dll 141 which may be used during malicious access of print services registry 132.

Anti-malware module 114 may be configured to intercept access to print services registry 132. Anti-malware module 114 may be configured to intercept the access through any suitable mechanism. For example, anti-malware module 114 may be configured to intercept access by using file system filters on the files storing print services registry 132, hooking functions configured to access print services registry 132, or registering call-back functions upon access to print services registry 132.

Upon detecting attempted access of print services registry 132, anti-malware module 114 may be configured to determine whether the access originates from malicious entities or includes malicious modifications. To make such determinations, anti-malware module 114 may take any suitable action such as consulting signature database 116 or accessing reputation server 104 as described below.

Figure 2:
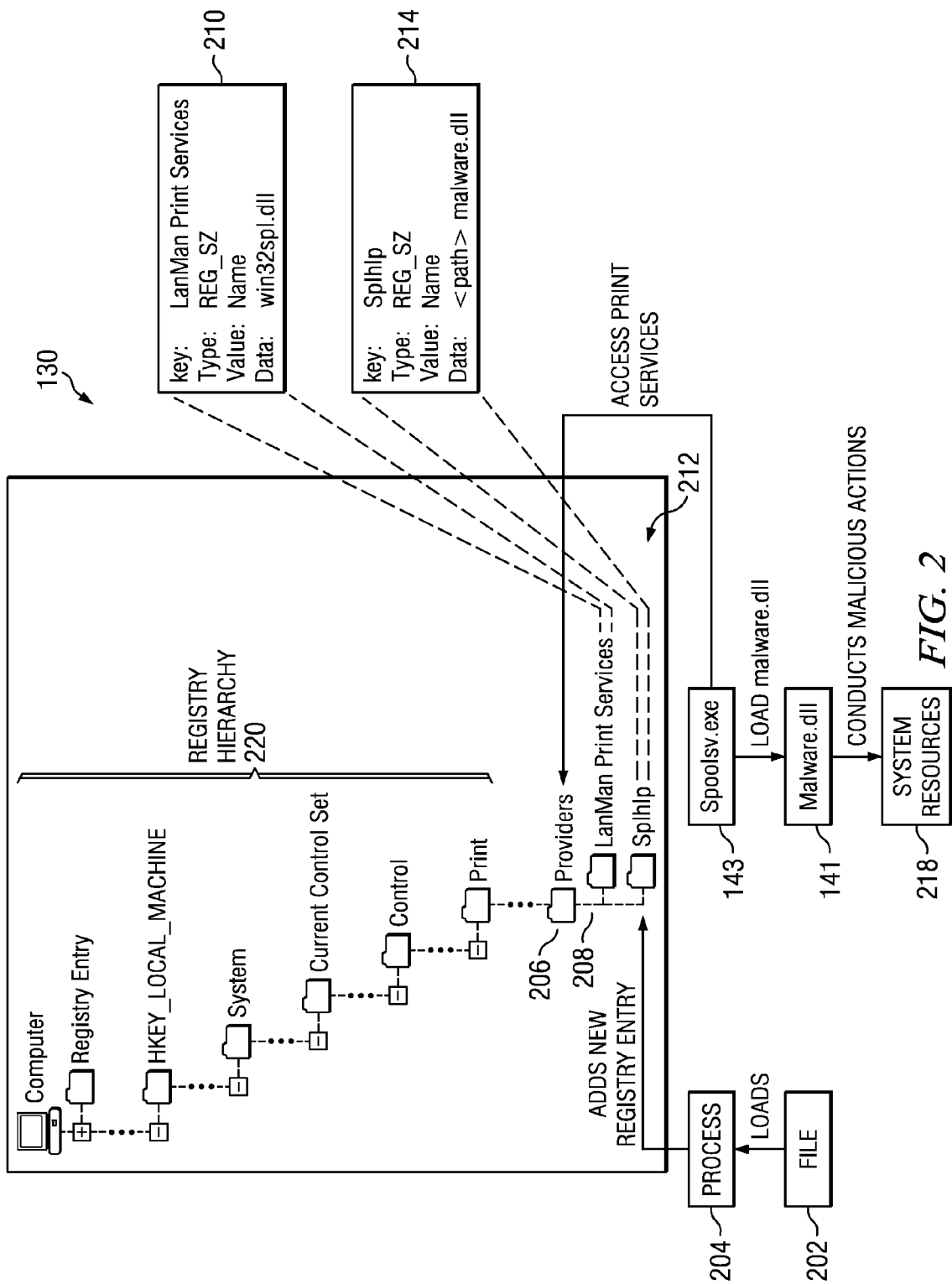
FIG. 2 is an illustration of examples of access or modifications to a print-provider registry that may be evaluated by an anti-malware module.

FIG. 2 is an illustration of examples of access or modifications to print services registry 132 that may be evaluated by anti-malware module 114. Registry 131 is shown with example entries and an example registry hierarchy 220. For example, in a Windows™ operating system, registry 131 may include registry hierarchy 220 of keys representing functionality and/or programs such that print services registry 132 may be located at "Computer >>HKEY_LOCAL_MACHINE >>System>>CurrentControlSet>>Control>>Print."

Print services registry 132 may include subkeys for "Providers" 206 wherein print services on electronic device 102 may be registry. The subkey for "Providers" 206 may include subkeys for various print services that have been registered to operate on electronic device 102. For example, "Providers" 206 may include a subkey corresponding to print services that are installed by default such as "LanMan Print Services" 208.

The registry settings of "LanMan Print Services" 208 may be illustrated in subkey 210, wherein "LanMan Print Services" is a registry subkey of type REG_SZ and is set with the data "win32spl.dll." The data may contain a path to the identified file. Win32spl.dll may be the default print program on electronic device 102 and may be configured to handle print requests. Accordingly, when an entity on electronic device 102 for printing, such as spoolsv.exe 143, accesses "Providers" 206 to determine how to print, "win32spl.dll" may cause specified processes to be executed to handle a print request.

A file 202 may launch a process 204 which may make an addition or a change to "Providers" 206. For example, a new registry entry in the form of a new subkey under "Providers" 206 may be created. In another example, existing registry settings of "LanMan Print Services" 208 or other subkeys may be altered or deleted. The additions or changes may be malicious. Anti-malware module 114 may be configured to detect such addition or changes and determine whether they are malicious.

Process 204 may add a new registry subkey "Splhlp" 212 in the print services registry under "Providers" 206. The registry settings of "Splhlp" 212 may be illustrated in subkey 212, wherein "Splhlp" is a registry subkey of type REG_SZ and is set with the data "malware.dll." The data may contain a path to the identified file. The data may correspond to the file malware.dll 141. "Splhlp" 212 may supplant "LanMan Print Services" as the default print service on electronic device 102 as configured by registry 131. Accordingly, when an entity, such as spoolsv.exe 143, on electronic device 102 is loaded to facilitate printing, malware.dll 141 may be executed. Spoolsv.exe 143 may be executed each time at system startup, meaning that malware.dll 141 will be loaded at the next startup. Malware.dll 141 may conduct various additional malicious actions on various system resources 218.

Process 204 may also attempt to change values in the subkey 210 for "LanMan Print Services." Such changes may include redirecting execution to malware.dll.

Returning to FIG. 1, upon detecting an access of print services registry 132 such as those shown in FIG. 2, anti-malware module 114 may evaluate the attempted access or the entity making the access. Anti-malware module 114 may determine the identity of the process making the access and whatever entities spawned the process. For example, if unknown_process 124 accessed print services registry 132, anti-malware module 114 may determine the file, unknown_process file 138, that launched the process. Upon detecting an attempted change to print services registry 132, anti-malware module 114 may be configured to determine the identity of any files to be subsequently loaded based upon changes to print services registry 132.

Anti-malware module 114 may be configured to determine a digital signature, digital hash, or other identification of the process or file spawning the process or of a file to be loaded by changes in the print services registry 132. Such identification may uniquely identify the process or file. In one embodiment, anti-malware module 114 may access signature database 116 to determine whether the process or file is known to be malware. Anti-malware module 114 may use the signature or hash of the process or file to look up the process or file in signature database 116. In another embodiment, anti-malware module 114 may access reputation server 104 to determine the malware status of the process or file.

Reputation server 104 may be configured to accept requests from clients such as anti-malware module 114 for information about the malware status of a given process or file. Reputation server 104 may be configured to mine and record information regarding processes or files from a wide variety of clients located in many different locations. Reputation server 104 may include or be communicatively coupled to a reputation database 144. Reputation database 144 may include information regarding processes or files, including whether the process or file is known to be malware, known to be safe, or unknown with regards to malware status. Reputation database 144 may index such information according to, for example, digital hash or signature. Reputation database 144 may include counters for determining how often a process or file has been reported. Reputation database 144 may be implemented in any suitable mechanism such as a file, record, database, or any combination thereof.

A given file or process may be determined in reputation database 144 to be safe based on research by anti-malware researchers, number and distribution of reported instances, association with known safe websites or other files, or other suitable criteria. A given file or process may be determined in reputation database 144 to be unsafe based on research by anti-malware researchers, number and distribution of reported instances, association with known malicious websites or behavior, or other suitable criteria. A given file or process may be determined in reputation database 144 as having an unknown malware status if not enough information exists with respect to its malware status. Unknown entries in reputation database 144 may be added when reported from clients such as anti-malware module 114 for the first time.

The reputation of the entity—such as a file or process—may be based on network sites or files accessed by the process, originating file, or associated file. For example, if malicious_process 128 process attempted to contact a remote network site known to reputation server 104 to host malware, such behavior may indicate that malicious_process 128 is malicious. Malicious_process 128 may be keylogging input on electronic device 102 and transmitting results to the remote network site, downloading malicious software from the remote network site, or conducting other malicious actions. Even though the specific identity of such a given file or process may not be known or previously identified, reputation server 104 may thus provide a reputation analysis of the file or process.

The reputation of the entity may be based on the behavior of the process, originating file, or associated file. For example, spoofed_process 130 may attempt to access sensitive portions of electronic device 102 with a process name appearing to be that of a normally trusted process. However, spoofed_process 130 may have been spawned from an unknown_process_file 136 when normally a process with the same name as spoofed_process 130 would be spawned from, for example, good_process_file 134. By receiving information about the calling hierarchy between entities on electronic device 102, reputation server 104 may thus examine the behavior to determine whether it is unexpected and thus suspicious.

The reputation of the entity may be based on how many instances of the process, originating file, or associated file have been reported, and across what geographical areas it has been reported. For example, a process or file that has never before encountered may be determined to be unknown. A process or file with a wide distribution in a short time may be a new printer driver deployed as part of a new release or operating system patch. Such a process or file may be determined to be safe. A process, originating file, or associated file with only a few reported instances, or one contacting known malicious websites may be determined to be malicious. From the time the reputation server 104 first encounters a new process or file, the process or file may thus be designated unknown, but based on additional information over time the process or file may be designated as safe or unsafe.

Anti-malware module 114 may be configured to receive the malware status from reputation server 104 of the process or file under examination. Based on its analysis or the information received from reputation server 104, anti-malware module 114 may be configured to perform any suitable action with respect to the attempted access of print services registry 132. Anti-malware module 114 may be configured to allow the attempted access, deny the attempted access, send additional information to reputation server 104, clean a process or file from electronic device 102, or take any other suitable action.

In operation, anti-malware module 114 may be operating to protect electronic device 102 from malicious modifications to print services registry 132 that may cause print-provider startup malware. In one embodiment, anti-malware module 114 may be executing on electronic device 102. In another embodiment, anti-malware module 114 may be communicating with electronic device 102 to protect it from such modifications.

Anti-malware module 114 may intercept or detect attempted access to any suitable portion, such as print services registry 132, of a registry of electronic device 102 to modify or change print service settings. For example, signed_process 122, unknown_process 124, good_process 126, malicious_process 128, or spoofed_process 130 may access print services registry 132 and be detected by anti-malware module 114. Anti-malware module 114 may determine the process making such an attempt. Furthermore, anti-malware module 114 may determine one or more sources of the process, such as a file like good_process_file 134, malicious_process_file 136, unknown_process_file 138, or signed_process_file 140. In addition, anti-malware module 114 may determine whether an attempted change of print services registry 132 includes an attempted or future load of a file such as win32spl.dll 139 or malware.dll 141. Also, anti-malware module 114 may determine whether any such process or file is digitally signed. Anti-malware module 114 may determine whether a digital hash for any such file or process is listed as malware in signatures database 116. After determining the identity of the entity, anti-malware module 114 may determine whether reputation server 104 has designated the file or process as safe, malicious, or unknown as to malware status.

Based on its determinations, anti-malware module 114 may determine how to handle the attempted access of print services registry 132. Determinations of how to handle attempted access of print services registry 132 may be made by, for example, rules or from input from user 106. Rules on how to handle the attempted access may, for example, be set within anti-malware module 114, received from reputation server 104, or stored and accessed in configuration files or settings on user 106. Anti-malware module 114 may alert user 106 of malware determinations and may prompt user 106 for input regarding how to proceed based on such determinations.

For example, anti-malware module 114 may allow signed processes to access print services registry 132. Anti-malware module 114 may determine that signed_process 122 has attempted to access print services registry 132, and that signed_process_122 was spawned from signed_process_file 140. Anti-malware module 114 may determine that signed_process_file 140 has been digitally signed by a trusted creator as evidenced by digital certificate 142. Signed_process 122 may then be allowed to modify entries within print services registry 132.

In one embodiment, if the process or associated file is not signed, anti-malware module 114 may deny access to print services registry 132. In another embodiment, anti-malware module 114 may use additional analysis, such as the techniques described below, to determine whether to grant access to print services registry 132.

Anti-malware module 114 may communicate the result of these determinations to user 106. Anti-malware module 114 may indicate to user 106 that a signed process such as signed_process 122 is attempting to access print services registry 132. In one embodiment, anti-malware module 114 may indicate that the access will be allowed. In another embodiment, anti-malware module 114 may provide user 106 the option to allow or disallow the access. Anti-malware module 114 may indicate to user 106 that an unsigned process—such as spoofed_process 130, if spoofed_process 130 is not digitally signed—is attempting to access print services registry 132. In one embodiment, anti-malware module 114 may indicate that the access will not be allowed. In another embodiment, anti-malware module 114 may provide user 106 the option to allow the access. In yet another embodiment, anti-malware module 114 may only indicate that the access is being attempted while proceeding to other techniques of determining the malware status of the process.

Anti-malware module 114 may deny access of print services registry 132 to processes or files determined to be malicious, or deny access to processes creating changes associated with files determined to be malicious. Such a process may be, for example, malicious_process 128. Anti-malware module 114 may use an identifying digital hash computed from the image of malicious_process 128 to determine from signature database 116 that the process is associated with malware. Anti-malware module 114 may access reputation database 104 with information about malicious_process 128, such as the signature or websites contacted by the process, to determine whether malicious_process 128 is malicious. The analysis of malicious_process 128 may be conducted instead on a file which spawned malicious_process 128, such as malicious_process_file 136. Given a detection of malicious_process 128, anti-malware module 114 may determine that malicious_process_file 136 generated the process and may proceed with similar analysis of the file. Processes or files determined to be malicious or associated with malware may be quarantined, removed, or otherwise handled to remove their ability to commit malicious acts on electronic device 102.

In one embodiment, if such a process or file is not determined to be unsafe or malicious, then it may be assumed that the process or file is safe and allowed to access print services registry 132. For example, unknown_process might not be determined to be unsafe or malicious, and thus by default be determined to be safe. In another embodiment, anti-malware module 114 may use additional analysis to determine whether to grant access to print services registry 132.

Anti-malware module 114 may communicate the result of these determinations to user 106. Anti-malware module 114 may indicate to user 106 that a process or file such as malicious_process 128 is attempting to access print services registry 132. In one embodiment, anti-malware module 114 may indicate that the access will be denied. In another embodiment, anti-malware module 114 may provide user 106 the option to allow or disallow the access. Anti-malware module 114 may communicate identification about the process or file determined to be malicious to reputation server 104 for additional analysis. Such information may include the process name, associated files, file name and associated processes, digital hash of the process or file, or other suitable information.

Anti-malware module 114 may allow access of print services registry 132 to processes or files determined to be not associated with malware, such as good_process 126. Anti-malware module 114 may use an identifying digital hash computed from the image of good_process 126 to determine from signature database 116 that the process is known to be safe and positively identified as not associated with malware. Anti-malware module 114 may access reputation database 104 with information about good_process 126, such as the signature or websites contacted by the process, to determine whether good_process 126 is malicious. The analysis of good_process 126 may be conducted instead on a file which spawned good_process 126, such as good_process_file 134. Given a detection of good_process 126, anti-malware module 114 may determine that good_process 126 generated the process and may proceed with similar analysis of the file. Processes or files determined to be safe may be allowed to access print services registry 132.

In one embodiment, if such a process or file is not determined to be safe, then such a process or file may have a malware status of unsafe or unknown. The process or file may be denied access print services registry 132. For example, unknown_process might not be determined to be safe, and thus by default be assumed to be unsafe. In another embodiment, anti-malware module 114 may use additional analysis to determine whether to grant access to print services registry 132.

Anti-malware module 114 may communicate the result of these determinations to user 106. Anti-malware module 114 may indicate to user 106 that a process or file such as good_process 126 is attempting to access print services registry 132. In one embodiment, anti-malware module 114 may indicate that the access will be allowed. In another embodiment, anti-malware module 114 may provide user 106 the option to allow or disallow the access. Anti-malware module 114 may communicate identification about the process or file to be malicious to reputation server 104 for additional analysis. Such information may include the process name, associated files, file name and associated processes, digital hash of the process or file, or other suitable information. The information may be transmitted to reputation server 104 for reputation analysis because even though, for example, good_process 126 is known to be free from malware, good_process 126 may not normally access print services registry 132, and thus may be compromised in a manner for which detection does not yet exist.

Anti-malware module 114 may allow or deny access of print services registry 132 to processes or files whose malware status cannot be determined and are thus unknown. Anti-malware module 114 may take into account system settings or user input when considering whether to allow or deny access to unknown files or processes. For example, anti-malware module may consider how to handle access by unknown_process 124 or a process spawned from unknown_process_file 138. Anti-malware module 114 may use an identifying digital hash computed from the image of unknown_process 124 or unknown_process_file 138 to determine from signature database 116 that the process is unknown as to its malware status. Anti-malware module 114 may access reputation server 104 with information about unknown_process 124 or unknown_process_file 138, such as the signature or websites contacted by the process, to determine whether good_process 126 is malicious.

Anti-malware module 114 may access user 106, reputation server 104, or internal settings to determine how to handle unknown_process 124. In some situations, unknown_process 124 may be safe, though its status is presently unknown. For example, a new printer driver may have been released by a printer or operating system vendor. In such an example, the unknown status of the process may exist for a short time as the printer driver is distributed among many users. Reputation server 104 may determine that such a large distribution of the same process or file may indicate that the entity is safe and the result of a new software release. In other situations, unknown_process 124 may be malicious or otherwise associated with malware, though its status is presently unknown. Such situations may include so-called "zero day" attacks, in which malware operates before signatures or other detection mechanisms can be developed targeting the particular instance of malware.

In one embodiment, anti-malware module 114 by default may allow an unknown process to access print services registry 132. In another embodiment, anti-malware module 114 by default may deny an unknown process to access print services registry 132. In yet another embodiment, anti-malware module 114 may indicate to user 106 that the process attempting to access print services registry 132 is unknown, suggest that the process be blocked, and await input from user 106.

Anti-malware module 114 may communicate the result of these determinations to user 106. Anti-malware module 114 may indicate to user 106 that a process or file such as unknown_process 124 or unknown_process_file 138 is attempting to access print services registry 132. In one embodiment, anti-malware module 114 may indicate that the access will be allowed. In another embodiment, anti-malware module 114 may provide user 106 the option to allow or disallow the access. Anti-malware module 114 may communicate identification about the process or file to be malicious to reputation server 104 for additional analysis. Such information may include the process name, associated files, file name and associated processes, digital hash of the process or file, or other suitable information.

Anti-malware module 114 may evaluate the malware status of a file to be referenced within a change in print services registry 132. For example, anti-malware module 114 may determine that unknown_process 124 has attempted to modify print services registry 132. Anti-malware registry 132 may examine the attempted change, for example, the creation of subkey 214 in FIG. 2. Subkey 214 may reference malware.dll 141, which will be executed at the next startup of electronic device 102. Anti-malware module 114 may evaluate the malware status of malware.dll 141 using techniques such as those described above. Depending upon the status determination, anti-malware module 114 may take appropriate corrective action.

Depending upon the results of evaluating a process detected accessing print services registry 132, anti-malware module 114 may evaluate the status of the file that spawned the file. In one embodiment, such an additional evaluation may be conducted when the status of the process is unknown. For example, unknown_process 124 may attempt to access print services registry 132 and anti-malware module 114, and after consulting signatures database 116 or reputation server 104, may not be able to determine the malware status of unknown_process 124. Unknown_process 124 may have been spawned from, for example, a file known to be safe such as good_process_file 134, a file known to be unsafe such as malicious_process_file 136, or a file whose malware status is unknown such as unknown_process_file 138. Anti-malware module 114 may take appropriate corrective action depending upon the determined malware status of the file that spawned the process accessing print services registry 132.

Figure 3:
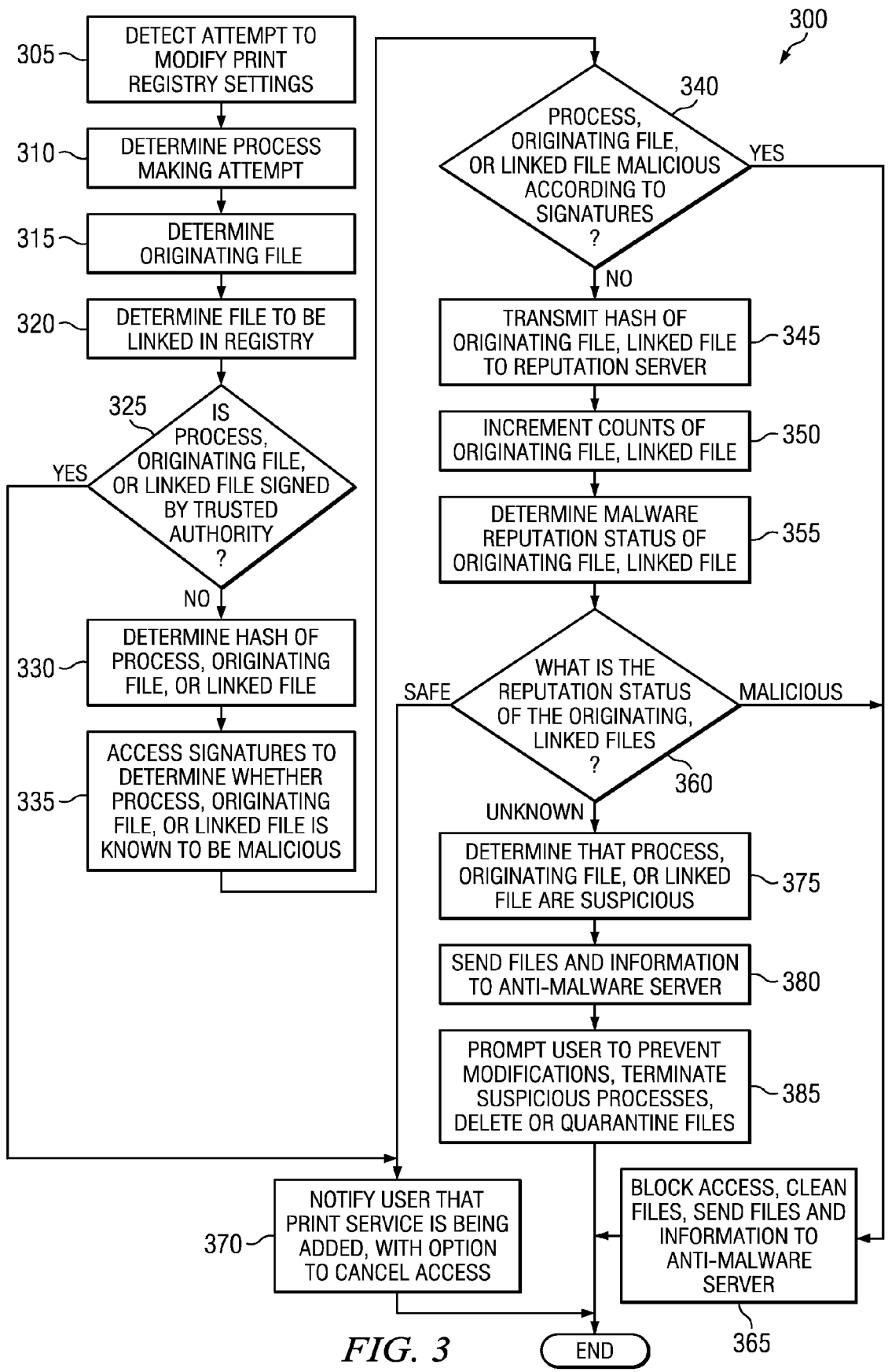
FIG. 3 is an illustration of example method for preventing and detecting print-provider startup malware.

FIG. 3 is an illustration of example method 300 for preventing and detecting print-provider startup malware. In step 305, an attempt may be made to access a print service registry, including adding or deleting subkeys or modifying values within a subkey. The attempt to access the print service registry may be detected. In step 310, the process making the attempt may be determined, and in step 315 the file or other entity from which the process originated may be determined. In step 320, if the attempt has or would create, modify, or otherwise cause data in the registry to reference a file, the identity of the referenced file may be determined. Such a file may be referenced, for example, for execution of the file given a system startup event.

Analysis on whether the an attempted access of the print service registry is malicious may be conducted on the process making the attempt, the file that spawned the process making the attempt, or on files associated with the attempt, such as those to which print registry settings are redirected. For example, steps 325-385 may be conducted for any such entity.

In step 325, it may be determined whether the process, originating file, or associated file has been signed by a creator of an associated file. Such a digital signature may provide assurance that the file is not compromised or spoofed. If the process, originating file, or associated file has been signed by its creator, method 300 may proceed to step 375. The process, originating file, or associated file may be trusted to access the print services registry. If the process, originating file, or associated file has not been digitally signed by its creator, then in step 330 a hash or other unique digital identifier of the process, originating file, or associated file may be determined. Other information, such as the file name, network sites visited, files accessed, or other characteristics or behavior may be recorded.

In step 335, a record of signatures identifying malware may be accessed to determine in step 340 whether the process, originating file, or associated file is known to be malicious. If it is known to be malicious, then method 300 may proceed to step 365. If it is not known to be malicious, then in step 345 the hash or other information regarding the process, originating file, or associated file may be transmitted to a reputation server.

Information about the detected process, originating file, or associated file may be stored in the reputation server. In step 350, counts associated with the detected process, originating file, or associated file may be incremented in the reputation server. Information collected at the point of detection as well as information regarding the location and time of the detection may be stored. A copy of the code for the process, originating file, or associated file may be stored for use by anti-malware researchers.

In step 355, the reputation of the process, originating file, or associated file may be determined. The reputation of the entity may be based on network sites or files accessed by the process, originating file, or associated file. The reputation may be based on the behavior of the process, originating file, or associated file. The reputation may be based on how many instances of the process, originating file, or associated file have been reported, and across what geographical areas it has been reported. For example, a process, originating file, or associated file never before encountered may be determined to be unknown. A process, originating file, or associated file with a wide distribution in a short time may be a new printer driver deployed as part of a new release or operating system patch. A process, originating file, or associated file with only a few reported instances, or one contacting known malicious websites may be determined to be malicious. A process, originating file, or associated file may thus be considered unknown, and based on additional information gathered over time may then be determined to be safe or malicious.

It step 360, it may be determined whether the process, originating file, or associated file is malicious, safe, or unknown with regards to malware status. If the process, originating file, or associated file is determined to be malicious, then method 300 may proceed to step 365. If the process, originating file, or associated file is determined to be safe, then method 300 may proceed to step 370. If the process, originating file, or associated file is determined to be unknown with regards to malware status, then method 300 may proceed to step 375.

In step 365, a process, originating file, or linked file determined to be malicious may be handled. In one embodiment, such a determination may have been made by determining that the process, originating file, or linked file was not signed by its creator. This may represent a very aggressive approach to preventing print-provider startup malware. False positives—wherein a legitimate entity is mistakenly determined to be malware—may occur with such an approach. In another embodiment, such a determination may have been made in a manner similar to or implemented by step 340, wherein a hash or identifier from the entity and then compared against known malware signatures. While any such matches may strongly indicate malware, this approach may be limited by the availability of known identifiers for the many instances of malware in the world. In yet another embodiment, such a determination may have been made in a manner similar to or implemented by step 360, wherein a reputation for the entity is determined. A process, originating file, or linked file determined to be malicious may be handled in any suitable manner for removing the malware threat that it poses. For example, access to the print services registry may be blocked, files associated with the entity may be removed, or the entity may be quarantined or placed into a sandbox for controlled operation. Information about the entity or files associated with the entity may be sent to the reputation server for additional analysis.

In step 370, a process, originating file, or linked file determined to be safe may be handled. In one embodiment, such a determination may have been made in a manner similar to step 325, wherein if the entity was signed by its creator with a trusted digital signature then the file is to be trusted with respect to access of the services print registry. However, in such an embodiment the security provided of method 500 is reliant upon the trustworthiness of the entity's signature. Further, while the entity may be intact, operational parameters or external resources used by the entity may be compromised, controlling the entity and causing it to behave maliciously. Thus, in another embodiment an entity with a trusted signature may be still be evaluated by, for example, comparing the entity against malware signatures or evaluating the entity with a reputation server. In yet another embodiment, such a determination may be made in manner similar to step 360, wherein a reputation server has determined that the entity is safe, then the file is to be trusted with respect to access to the print services registry.

A process, originating file, or linked file determined to be safe may be handled in any suitable manner for removing the malware threat that it poses. In one embodiment, access to the print services registry may be granted to the entity to make changes. In another embodiment, in step 370 a user, administrator, server, or other mechanism may be notified of the attempted access. In a further embodiment, an option to override the decision to trust the entity may be given. If such an option is selected, for example, by user input, security setting, or preference, then the access to the print services registry may be denied.

In step 375, a process, originating file, or linked file determined to be unknown with regards to malware status may be handled. In one embodiment, such an unknown entity may be handled as malicious according to step 365. However, such an approach may lead to, for example, false positive identification of malware, which may hamper usability. In another embodiment, such an unknown entity may be handled as safe according to step 370. However, such an approach may fail to detect malware such as polymorphic malware on a zero-day attack.

In yet another embodiment, because the malware status is unknown the process, originating file, or linked file may be determined to be suspicious. In step 375, files and information associated with the process, originating file, or linked file may be sent to the reputation server for further analysis. In step 385, a user of the electronic device may be prompted with the information that an unknown entity is trying to access the print services registry. The used—or security settings, security server, or other mechanism—may be enabled to dictate whether to allow access, prevent any modifications to the print services registry, terminate suspicious processes, quarantine suspicious files, or remove them altogether. Options to clean or quarantine suspicious files or processes may be set as a default choice.

Method 300 may be implemented using the system of FIGS. 1-2, or any other system operable to implement method 300. As such, the preferred initialization point for method 300 and the order of the steps comprising method 300 may depend on the implementation chosen. In some embodiments, some steps may be optionally omitted, repeated, or combined. In certain embodiments, method 300 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for preventing malware attacks, comprising:
   detecting an attempt on an electronic device to modify a print service registry, the print service registry configured to store configuration information about mechanisms to be used when printing from the electronic device;
   determining an entity associated with the attempt to modify the print service registry;
   determining a malware status of the entity;
   based on the malware status of the entity, allowing or denying the modification to the print service registry.

2. The method of claim 1, further comprising determining the malware status of the entity to be unknown.

3. The method of claim 2, further comprising allowing the entity with unknown malware status to modify the print service registry.

4. The method of claim 2, further comprising denying the attempted modification by the entity with unknown malware.

5. The method of claim 1, further comprising:
   determining the malware status of the entity to be safe if the entity has been digitally signed by a trusted author; and
   allowing the entity to modify the print service registry.

6. The method of claim 1, wherein:
   the entity is a process running on the electronic device generated from a file on the electronic device; and
   determining the malware status of the entity includes determining the malware status of the process and determining the malware status of the file.

7. The method of claim 1, wherein the modification includes linking to a linked file to be executed upon startup of the electronic device.

8. The method of claim 7, further comprising:
   determining the modification and the linked file;
   determining a malware status of the linked file;
   based on the malware status of the linked file, allowing or denying the modification to the print service registry.

9. An article of manufacture, comprising:
   a non-transitory computer readable medium; and
   computer-executable instructions carried on the non-transitory computer readable medium, the instructions readable by a processor, the instructions, when read and executed, for causing the processor to:
      detect an attempt on an electronic device to modify a print service registry, the print service registry configured to store configuration information about mechanisms to be used when printing from the electronic device;
      determine an entity associated with the attempt to modify the print service registry;
      determine a malware status of the entity;
      based on the malware status of the entity, allow or deny the modification to the print service registry.

10. The article of claim 9, wherein the processor is further caused to determine that the malware status of the entity is unknown.

11. The article of claim 10, wherein the processor is further caused to allow the entity with unknown malware to modify the print service registry.

12. The article of claim 10, wherein the processor is further caused to deny the attempted modification of the print service registry by the entity with unknown malware status.

13. The article of claim 9, wherein the processor is further caused to:
   determine the malware status of the entity to be safe if the entity has been digitally signed by a trusted author; and
   allow the entity to modify the print service registry.

14. The article of claim 9, wherein:
   the entity is a process running on the electronic device generated from a file on the electronic device; and
   determining the malware status of the entity includes determining the malware status of the process and determining the malware status of the file.

15. The article of claim 9, wherein the modification includes linking to a linked file to be executed upon startup of the electronic device.

16. The article of claim 15, wherein the processor is further caused to:
  determine the modification and the linked file;
  determine a malware status of the linked file;
  based on the malware status of the linked file, allow or deny the modification to the print service registry.

17. A system for preventing malware attacks, comprising:
  a processor coupled to a memory; and
  an anti-malware module executed by the processor, resident within the memory, and communicatively coupled to a print services registry on an electronic device;
  the anti-malware module configured to:
    detect an attempt on an electronic device to modify a print service registry, the print service registry configured to store configuration information about mechanisms to be used when printing from the electronic device;
    determine an entity associated with the attempt to modify the print service registry;
    determine a malware status of the entity;
    based on the malware status of the entity, allow or deny the modification to the print service registry.

18. The system of claim 17, wherein the anti-malware module is further configured to determine that the malware status of the entity is unknown.

19. The system of claim 18, wherein the anti-malware module is further configured to allow the entity with unknown malware to modify the print service registry.

20. The system of claim 18, wherein the anti-malware module is further configured to deny the attempted modification of the print service registry by the entity with unknown malware status.

21. The system of claim 17, wherein the anti-malware module is further configured to:
  determine the malware status of the entity to be safe if the entity has been digitally signed by a trusted author; and
  allow the entity to modify the print service registry.

22. The system of claim 17, wherein:
  the entity is a process running on the electronic device generated from a file on the electronic device; and
  determining the malware status of the entity includes determining the malware status of the process and determining the malware status of the file.

23. The system of claim 17, wherein the modification includes linking to a linked file to be executed upon startup of the electronic device.

24. The system of claim 23, wherein the anti-malware module is further configured to:
  determine the modification and the linked file;
  determine a malware status of the linked file;
  based on the malware status of the linked file, allow or deny the modification to the print service registry.

* * * * *